United States Patent [19]
Murata et al.

[11] Patent Number: 5,941,508
[45] Date of Patent: Aug. 24, 1999

[54] HYDRAULIC SHOCK ABSORBER

[75] Inventors: Hiroshi Murata, Kawasaki; Chigaya Sekine, Yokohama, both of Japan

[73] Assignee: Tokico Ltd., Kawasaki, Japan

[21] Appl. No.: 08/859,779

[22] Filed: May 21, 1997

[30]     Foreign Application Priority Data

May 21, 1996  [JP]  Japan ..................................... 8-149966

[51] Int. Cl.⁶ ................................................. B60G 17/044
[52] U.S. Cl. .................... 267/64.17; 267/DIG. 2
[58] Field of Search ............................ 267/64.17, 64.16, 267/DIG. 1, DIG. 2, 64.15; 280/DIG. 1, 6.159, 6.158, 5.514, 124.157, 124.158, 124.159, 5.503, 5.515; 188/282.2, 266.2, 315, 266.6, 266.5

[56]           References Cited

U.S. PATENT DOCUMENTS

| | | | |
|---|---|---|---|
| 5,342,023 | 8/1994 | Kuriki et al. | 267/64.17 |
| 5,586,781 | 12/1996 | Anderson | 267/64.17 |
| 5,797,594 | 8/1998 | Sekine et al. | 267/64.17 |

FOREIGN PATENT DOCUMENTS

| | | |
|---|---|---|
| 25 11 880 | 3/1975 | Germany . |
| 3419166C1 | 12/1985 | Germany . |
| 60-261713 | 12/1985 | Japan . |
| 63/25837 | 5/1988 | Japan ..................................... 267/64.17 |

OTHER PUBLICATIONS

English Language abstract of Japanese Patent Publication No. 07174181 A, published Jul. 11, 1995.

*Primary Examiner*—Douglas C. Butler
*Attorney, Agent, or Firm*—Wenderoth, Lind & Ponack, L.L.P.

[57]           ABSTRACT

A hydraulic shock absorber including a cylinder having a hydraulic fluid sealed therein, a reservoir connected to the cylinder so that a pressure is always transmitted between the cylinder and the reservoir and a self-pumping mechanism provided between the cylinder and an oil tank to effect feeding and discharge of the hydraulic fluid between the oil tank and the cylinder by extension and contraction of a piston rod, to thereby control a length of extension of the piston rod. The cylinder is connected to a pressure accumulating mechanism having a pressure accumulating tank and a switching valve mechanism. The switching valve mechanism is adapted to be switched to accumulate a pressure in the pressure accumulating tank or apply a pressure accumulated in the pressure accumulating tank to the cylinder. By applying the pressure in the pressure accumulating tank to the cylinder, the vehicle height can be increased before running of the vehicle, so that a satisfactorily large road clearance can be ensured before running of the vehicle.

3 Claims, 5 Drawing Sheets

HYDRAULIC SHOCK ABSORBER

BACKGROUND OF THE INVENTION

The present invention relates to a hydraulic shock absorber having the capability of controlling a the height of vehicle, and being attached to a suspension system of a vehicle, for example, an automobile.

Generally, in a vehicle, for example, an automobile, a hydraulic shock absorber is provided between a sprung mass and an unsprung mass in a suspension system to thereby damp vibration of the spring, improving the ride quality and the steering stability of the vehicle.

However, with respect to a vehicle having a relatively large loading capacity, such as a van and a station wagon, a load on the vehicle may change greatly depending on the number of passengers and the number of articles carried. Vehicle height is dependent on a load of the vehicle, so that the ride quality and the steering stability of the vehicle may deteriorate as a load changes. Hence, it has been desired to develop a suspension system for a vehicle which is capable of automatically maintaining a predetermined vehicle height, regardless of load.

Unexamined Japanese Patent Application Publication (Kokai) No. 60-261713 discloses a so-called self-pumping type hydraulic shock absorber which comprises an oil tank and a reservoir, each having a high-pressure gas sealed therein, a pump means for supplying a hydraulic fluid in the oil tank into a cylinder by the extension and contraction of a piston rod, and a relief means for relieving a hydraulic fluid in the pump means and the cylinder to the oil tank in accordance with a change in position of the piston rod. In this self-pumping type hydraulic shock absorber, the pump means is operated by utilizing vibration of a suspension system during running of the vehicle, appropriately applying pressure to the cylinder and maintaining a predetermined length of an extension of the piston rod, to thereby automatically maintain a predetermined vehicle height.

However, the self-pumping hydraulic shock absorber disclosed in Kokai No. 60-261713 involves a problem as mentioned below. When an empty vehicle provided with the above-mentioned self-pumping hydraulic shock absorber is running, in the self-pumping hydraulic shock absorber, the pressure of the hydraulic fluid in the cylinder is low, due to the small load on the vehicle. When this vehicle is loaded, that is, the load on the vehicle increases, the vehicle height lowers by an amount corresponding to the increase in load on the vehicle. When the vehicle runs after loading, the pump means is operated and a hydraulic fluid in the oil tank is supplied to the cylinder, so that the vehicle height gradually increases until it reaches a predetermined height. However, due to the time required to complete pumping, the vehicle height is still low at an initial stage of running of the vehicle, so that initial road clearance may be too small with resultant bottoming of the suspension system. Therefore, when a load on the vehicle is large or the vehicle is running along an uneven surface, bottoming of the suspension system may occur.

BRIEF SUMMARY OF THE INVENTION

The present invention has been made, with a view to solving the above-mentioned problem. It is a primary object of the present invention to provide a hydraulic shock absorber for controlling vehicle height, which is capable of ensuring a satisfactory vehicle height immediately after an empty vehicle is loaded.

According to the present invention, there is provided a hydraulic shock absorber comprising:

a cylinder having a hydraulic fluid sealed therein;

a piston slidably fitted in the cylinder;

a piston rod connected at one end thereof to the piston, the other end of the piston rod extending as far as an outside of the cylinder;

a reservoir connected to the cylinder so that a pressure is always transmitted between the cylinder and the reservoir;

an oil tank connected to the cylinder; and a self-pumping mechanism provided between the cylinder and the oil tank to effect feeding and discharge of the hydraulic fluid between the oil tank and the cylinder by extension and contraction of the piston rod, to thereby control a length of extension of the piston rod, wherein the cylinder is connected to a pressure accumulating mechanism having a pressure accumulating tank and a switch valve mechanism, the switch valve mechanism being adapted to be switched to accumulate a pressure in the pressure accumulating tank or apply a pressure accumulated in the pressure accumulating tank to the cylinder.

When the hydraulic shock absorber of the present invention is attached to a suspension system in a vehicle, the self-pumping mechanism operates during the extension and compression strokes of the piston rod caused by vibration during running of the vehicle, thereby controlling the length of extension of the piston rod, so that a vehicle height of the vehicle is controlled at a predetermined level. The pressure accumulating tank accumulates a pressure in accordance with the operation of the self-pumping mechanism. When an empty vehicle is loaded, the vehicle height can be increased to a predetermined height by switching the switch valve mechanism to apply the pressure accumulated in the pressure accumulating tank to the cylinder, thereby extending the piston rod.

DETAILED DESCRIPTION OF THE INVENTION

Hereinbelow, embodiments of the present invention are described, with reference to the accompanying drawings.

Figure 1:
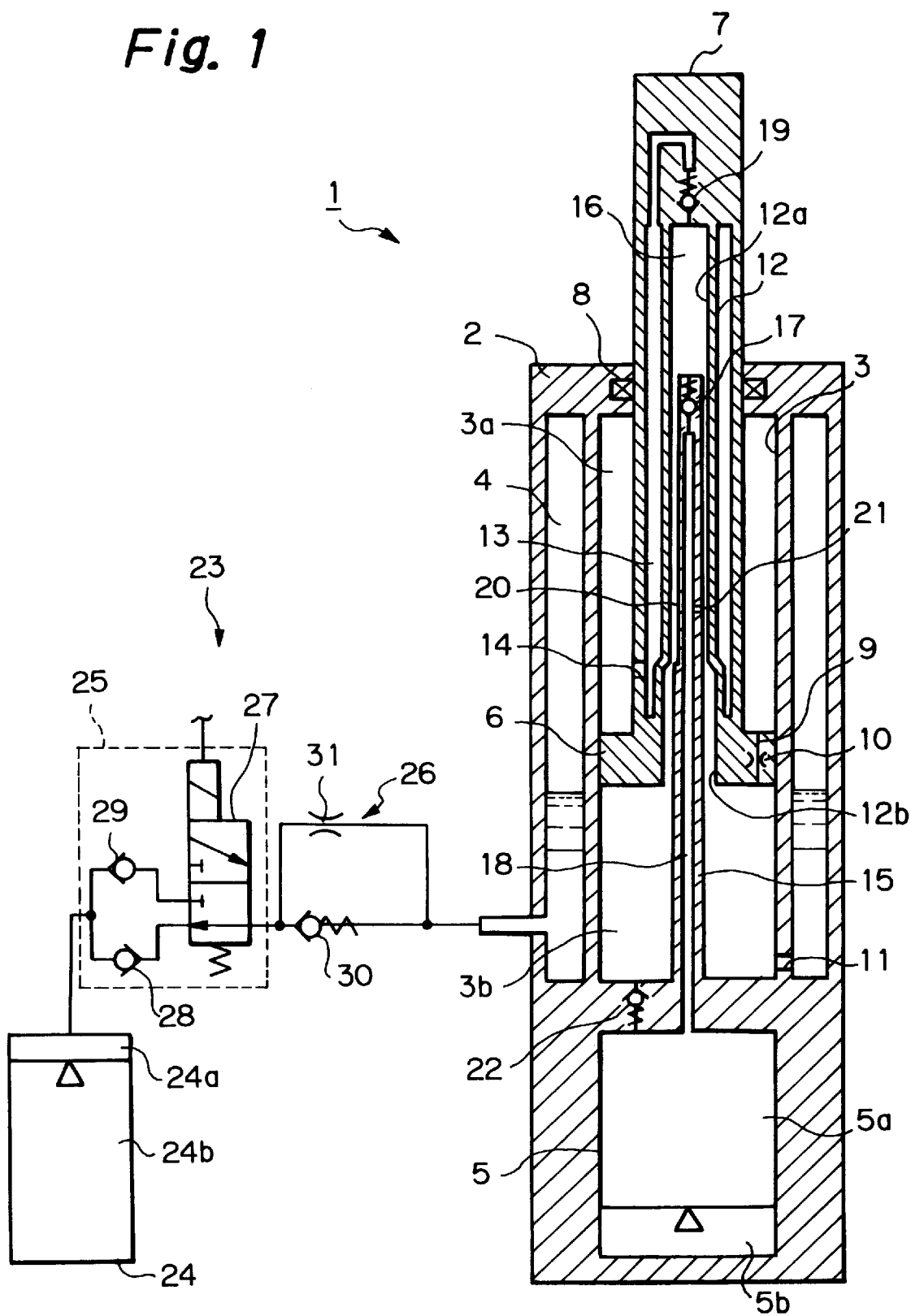
FIG. 1 is a schematic illustration showing a hydraulic shock absorber at an initial stage according to a first embodiment of the present invention.

A first embodiment of the present invention is explained, with reference to FIGS. 1 to 4. As shown in FIG. 1, a hydraulic shock absorber 1 has a hydraulic shock absorber body 2 comprising a cylinder 3, an annular reservoir 4 provided around the cylinder 3 and an oil tank 5 provided below the cylinder 3. A piston 6, which is slidably fitted in the cylinder 3, divides the inside of the cylinder 3 into two chambers, that is, a cylinder upper chamber 3a and a cylinder lower chamber 3b. One end of a hollow piston rod 7 is connected to the piston 6 and the other end of the piston rod 7 extends through a seal 8 which is provided at the upper end portion of the cylinder 3, and projected to the outside of the cylinder 3.

A hydraulic fluid is sealably contained in each of the cylinder upper chamber 3a and the cylinder lower chamber 3b, and a hydraulic fluid and a gas are sealably contained in each of the reservoir 4 and the oil tank 5. In FIG. 1 through FIG. 4, an oil chamber and a gas chamber in the oil tank 5 are designated by reference numerals 5a and 5b, respectively.

The piston 6 is provided with a hydraulic fluid passage 9 for providing communication between the cylinder upper chamber 3a and the cylinder lower chamber 3b and a damping force generating mechanism 10 comprising an orifice, a disk valve or the like for controlling a flow of the hydraulic fluid through the hydraulic fluid passage 9 to thereby generate a damping force. The cylinder lower chamber 3b is communicated with the reservoir 4 through a communication passage 11 provided in the side wall of the cylinder 3 near the lower end of the cylinder 3, so that a pressure is always transmitted between the cylinder 3 and the reservoir 4. Incidentally, since the communication passage 11 is adapted to have a flow resistance in order to generate a damping force for the compression stroke at the piston portion and for other purposes, pressures in the cylinder 3 and the reservoir 4 are transmitted with delay.

A stepped pump tube 12 having a small-diameter portion 12a and a large-diameter portion 12b is provided in the piston rod 7. An annular passage 13 is formed around the pump tube 12. The annular passage 13 is communicated with the cylinder upper chamber 3a through a hydraulic fluid passage 14 provided in the side wall of the piston rod 7.

A cylindrical pump rod 15 is provided in the cylinder 3 along the central axis thereof. A proximal end portion of the pump rod 15 is connected to the bottom of the cylinder 3, and a distal end portion of the pump rod 15 extends through the piston 6 and the large-diameter portion 12b of the pump tube 12 in the piston rod 7, and is slidably fitted in the small-diameter portion 12a of the pump tube 12. The distal end portion of the pump rod 15 defines a pump chamber 16 in the small-diameter portion 12a. The pump chamber 16 is communicated with the oil tank 5 through a check valve 17 provided at the distal end portion of the pump rod 15 and through a passage 18 in the pump rod 15. The check valve 17 allows a flow of hydraulic fluid only from the oil tank 5 toward the pump chamber 16. The pump chamber 16 is communicated with the annular passage 13 through a check valve 19 provided at a distal end portion of the piston rod 7, which valve allows a flow of hydraulic fluid only from the pump chamber 16 to the annular passage 13.

A channel 20 is formed in the side wall of the pump rod 15, which channel axially extends from the distal end portion of the pump rod 15 to a predetermined portion of the pump rod 15. Further, an orifice passage 21 is formed in the side wall of the pump rod 15. The orifice passage 21 is disposed on the side of the distal end portion of the pump rod 15, relative to an end portion of the channel 20 (a lower end portion of the channel 20 in FIGS. 1 through 4). When the length of extension of the piston rod 7 reaches a first predetermined length, the channel 20 is communicated with the large-diameter portion 12b of the pump tube 12, so that the pump chamber 16 is communicated with the cylinder lower chamber 3b through the channel 20 and the large-diameter portion 12b. When the piston rod 7 further extends and the length of extension of the piston rod 7 reaches a second predetermined length, the orifice passage 21 is communicated with the large-diameter portion 12b, so that the passage 18 in the pump rod 15 is communicated with the cylinder lower chamber 3b through the orifice passage 21 and the large-diameter portion 12b.

The pump tube 12, the pump rod 15, the pump chamber 16, the check valves 17 and 19, the channel 20 and the orifice passage 21 constitute a self-pumping mechanism which effects feeding and discharge of the hydraulic fluid between the oil tank 5 and the cylinder 3 by extension and contraction of the piston rod 7, to thereby control a length of extension of the piston rod 7.

The hydraulic shock absorber body 2 has a relief valve 22. When a hydraulic pressure in the cylinder 3 reaches a predetermined level, the relief valve 22 opens to thereby relieve the hydraulic fluid in the cylinder lower chamber 3b to the oil tank 5.

The reservoir 4 is connected to the pressure accumulating mechanism 23 comprising a pressure accumulating tank 24, a switch valve mechanism 25 and a shock absorbing mechanism 26. The pressure accumulating tank 24 is connected through the switch valve mechanism 25 and the shock absorbing mechanism 26 to the reservoir 4 and the cylinder 3 of the hydraulic shock absorber body 2.

The inside of the pressure accumulating tank 24 is divided, by a free piston, a diaphragm or the like, into an oil chamber 24a to store a hydraulic fluid and a gas chamber 24b having a gas sealed therein. A pressure of the hydraulic fluid in the oil chamber 24a is accumulated by compression and expansion of the gas in the gas chamber 24b.

The switch valve mechanism 25 comprises an electromagnetic switch valve 27 of 3 ports and 2 positions and two check valves 28 and 29. When the reservoir 4 is communicated with the pressure accumulating tank 24 through the check valve 28 by the switch valve 27, a flow of hydraulic fluid only from the reservoir 4 toward the pressure accumulating tank 24 occurs. When the switch valve 27 is switched by energizing a solenoid with electricity to thereby communicate the reservoir 4 with the pressure accumulating tank 24 through the check valve 29, a flow of hydraulic fluid only from the pressure accumulating tank 24 toward the reservoir 4 occurs. The switch valve 27 can be switched any time by, for example, a switch provided in a vehicle compartment (not shown).

The shock absorbing mechanism 26 comprises a check valve 30 and an orifice 31 which are disposed in parallel. The check valve 30 allows a flow of hydraulic fluid only from the pressure accumulating tank 24 toward the reservoir 4. With respect to a flow of hydraulic fluid from the reservoir 4 toward the pressure accumulating tank 24, the orifice 31 provides a resistance to the flow, to thereby suppress the generation of pulsation in the flow caused by a gas pressure in the pressure accumulating tank 24. With respect to a flow of hydraulic fluid from the pressure accumulating tank 24 toward the reservoir 4, the hydraulic fluid smoothly flows since the check valve 30 opens.

The operation of the above-mentioned first embodiment, arranged as described above, will be described below.

In the hydraulic shock absorber 1, during the extension and compression stroke of the piston rod 7, as the piston 6 moves, a hydraulic fluid flows through the hydraulic fluid passage 9 between the cylinder upper chamber 3a and the cylinder lower chamber 3b, to thereby generate a damping force by the damping force generating mechanism 10. In this instance, volmetric changes in the cylinder upper chamber 3a and the cylinder lower chamber 3b which occur when the piston 6 enters and withdraws from the cylinder 3 during the extension and contraction of the piston rod 7 are compensated for by the compression and expansion of the gas sealed in the reservoir 4.

Next, explanation is made with regard to how the hydraulic shock absorber 1 automatically controls a vehicle height. As shown in FIG. 1, the pressure accumulating tank 24 of the pressure accumulating mechanism 23 is normally communicated with the reservoir 4 through the check valve 28 by the switch valve 27. Initially, a pressure in the oil tank 5, a pressure in the reservoir 4 (corresponding to a pressure in the cylinder 3) and a pressure in the pressure accumulating tank 24 are the same. When the vehicle is empty, the length of extension of the piston rod 7 is within a predetermined standard range (between the first predetermined length and the second predetermined length). In this instance, the channel 20 in the pump rod 15 is communicated with the large-diameter portion 12b of the pump tube 12, so that the pump chamber 16 is communicated with the cylinder lower chamber 3b through the channel 20 and the large-diameter portion 12b. Therefore, the self-pumping mechanism does not conduct a pumping operation during the extension and contraction of the the piston rod 7.

When a load on the vehicle increases and a vehicle height lowers to a level such that the length of extension of the piston rod 7 is shorter than the first predetermined length, the channel 20 in the pump rod 15 is blocked from the large-diameter portion 12b of the pump tube 12. In this instance, when the piston rod 7 extends and contracts due to vibration during running of the vehicle, during the extension stroke of the piston rod 7, the pump rod 15 retracts, so that a pressure in the pump chamber 16 is reduced and hence, the check valve 17 opens, thereby introducing the hydraulic fluid in the oil tank 5 through the passage 18 into the pump chamber 16. On the other hand, during the compression stroke of the piston rod 7, the piston rod 7 lowers, so that the pump chamber 16 is pressurized and hence, the check valve 19 opens, thereby supplying the hydraulic fluid in the pump chamber 16 through the annular passage 13 and the hydraulic fluid passage 14 to the cylinder upper chamber 3a. The hydraulic fluid in the cylinder upper chamber 3a is further supplied to the cylinder lower chamber 3b and the reservoir 4, to thereby pressurize the gas in the reservoir 4, so that the piston rod 7 is extended. The self-pumping mechanism repeats the pumping operation in the above-mentioned manner by utilizing vibration during running of the vehicle. Consequently, the piston rod 7 is extended to thereby increase the vehicle height. When the vehicle height reaches a standard vehicle height, that is, when the length of extension of the piston rod 7 reaches the first predetermined height, the channel 20 of the pump rod 15 is communicated with the large-diameter portion 12b of the pump tube 12, so that a pumping operation is discontinued.

The hydraulic fluid which has been supplied to the reservoir 4 by the pumping operation is further supplied to the pressure accumulating tank 24 through the orifice 31, the switch valve 27 and the check valve 28 in the pressure accumulating mechanism 23, and is stored in the pressure accumulating tank 24 by the check valve 28, to thereby accumulate a pressure in the pressure accumulating tank 24. Since the pumping operation is conducted by utilizing vibration during running of the vehicle, a pressure which is higher than the pressure corresponding to the load on the vehicle can be momentarily generated, and this high momentary pressure is accumulated in the pressure accumulating tank 24 by the check valve 28, so that a satisfactorily high pressure relative to the load on the vehicle can be obtained in the pressure accumulating tank 24. Further, the generation of pulsation in the hydraulic fluid due to a gas pressure in the pressure accumulating tank 24 can be suppressed by supplying the hydraulic fluid through the orifice 31 to the pressure accumulating tank 24.

On the other hand, when a load on the vehicle is reduced and the vehicle height increases to a level such that the length of extension of the piston rod 7 reaches the second predetermined length, the orifice passage 21 in the pump rod 15 is communicated with the large-diameter portion 12b of the pump tube 12, so that the hydraulic fluid in the cylinder lower chamber 3b is returned through the large-diameter portion 12b, the orifice passage 21 and the passage 18 to the oil tank 5. Consequently, the piston rod 7 contracts, thereby lowering the vehicle height. When the vehicle height lowers to the standard vehicle height, that is, the length of extension of the piston rod 7 reaches the second predetermined length, the orifice passage 21 is closed by the small-diameter portion 12a of the pump tube 12, so that the returning operation for returning the hydraulic fluid from the cylinder lower chamber 3b to the oil tank 5 is discontinued.

Figure 2:
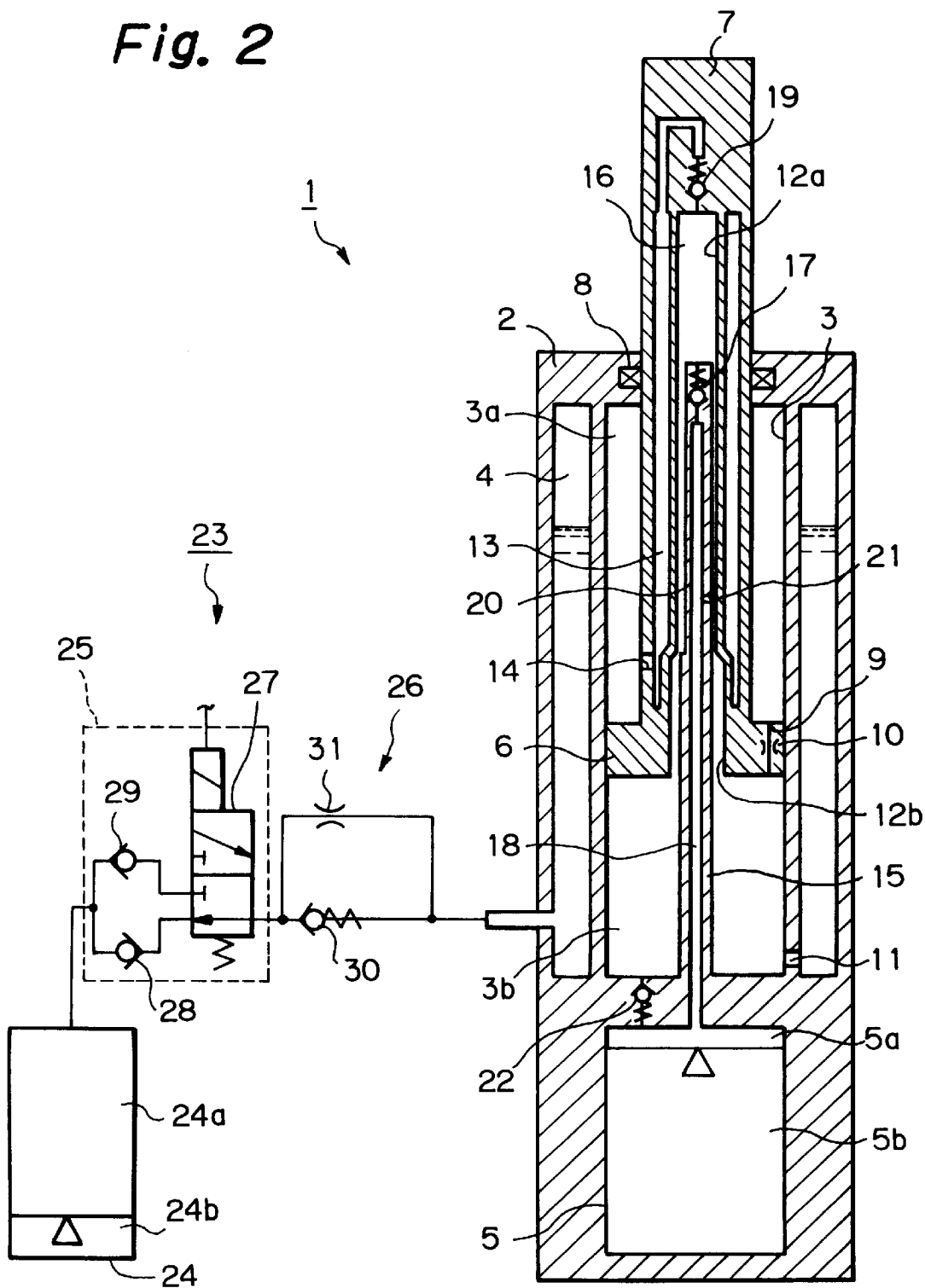
FIG. 2 is a schematic illustration showing the hydraulic shock absorber of FIG. 1 in which the length of extension of the piston rod is controlled and pressure is accumulated in the pressure accumulating tank.

By repeating the above-mentioned pumping and returning operations by utilizing vibration during running of the vehicle, the length of extension of the piston rod 7 is controlled between the first predetermined length and the second predetermined length, so that the vehicle height can be controlled at a predetermined level, regardless of a load on the vehicle. Further, by the pumping operation, the hydraulic fluid can be accumulated in the pressure accumulating tank 24 in the pressure accumulating mechanism 23. FIG. 2 shows the hydraulic shock absorber in which the length of extension of the piston rod 7 has been controlled and a pressure is accumulated in the pressure accumulating tank 24.

When a pressure in the cylinder 3 becomes extremely high due to the pumping operation or a pressure applied from the road surface to the vehicle during running thereof, the relief valve 22 opens to thereby relieve the hydraulic fluid in the cylinder 3 to the oil tank 5, so that the sealing portions and connections between members of the hydraulic shock absorber 1 do not undergo high loads and impact on the vehicle body is suppressed.

Figure 3:
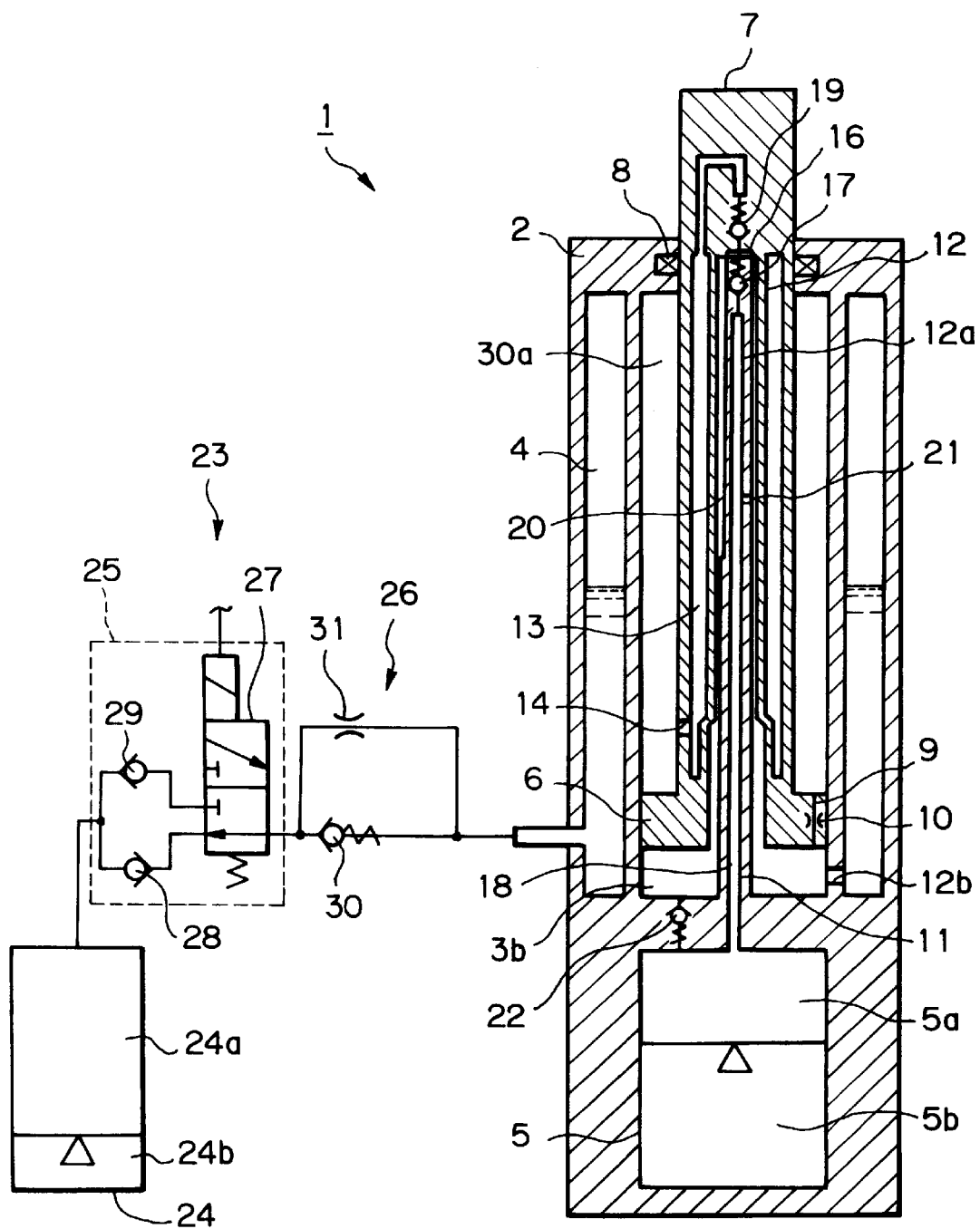
FIG. 3 is a schematic illustration showing the hydraulic shock absorber of FIG. 1 in which the piston rod is contracted due to an increase in load on the vehicle.
Figure 4:
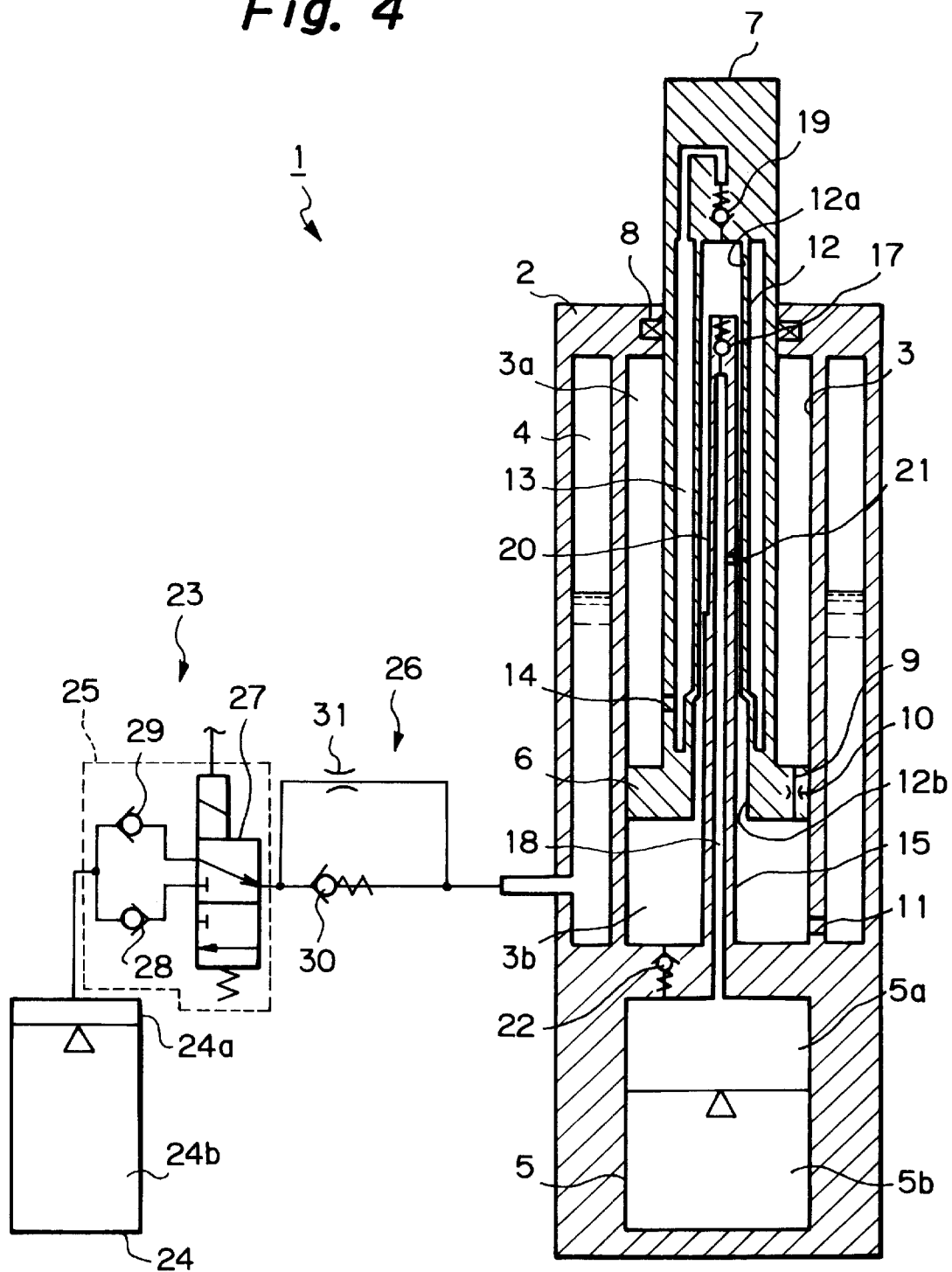
FIG. 4 is a schematic illustration showing the hydraulic shock absorber of FIG. 1 in which the pressure accumulated in the pressure accumulating tank is applied to the cylinder by switching the switch valve mechanism, to thereby extend the piston rod.

When an empty vehicle having a vehicle height which is controlled at the standard vehicle height is loaded, the vehicle height lowers, that is, the piston rod 7 contracts as shown in FIG. 3. In this instance, a switch in the compartment of the vehicle is switched on to energize the solenoid with electricity, thereby switching the switch valve 27. Consequently, as shown in FIG. 4, the pressure accumulating tank 24 is communicated with the reservoir 4 through the check valve 29, so that the high-pressure hydraulic fluid stored in the pressure accumulating tank 24 is supplied through the check valve 29, the switch valve 27 and the check valve 30 to the reservoir 4. Consequently, the gas in the reservoir 4 is pressurized, thereby extending the piston rod 7. When the length of extension of the piston rod 7 reaches the first predetermined length, that is, the vehicle height reaches the standard vehicle height, the switch valve 27 is switched by switching off the switch in the vehicle compartment, so that the supply of the hydraulic fluid from the pressure accumulating tank 24 to the reservoir 4 is discontinued. By this arrangement, immediately after the vehicle is loaded, the vehicle height can be increased to the standard vehicle height before running of the vehicle. Consequently, a satisfactorily large road clearance can be ensured before running of the vehicle, so that bottoming of the suspension system of the vehicle can be prevented. When the vehicle is running after the vehicle height is increased to the standard vehicle height, a pumping operation is conducted by utilizing vibration due to running of the vehicle, to thereby accumulate a pressure in the pressure accumulating tank 24 again.

Incidentally, even when a load on the vehicle is so large that it is difficult to increase the vehicle height to the standard vehicle height by the hydraulic fluid in the pressure accumulating tank 24, the vehicle height can be controlled at the standard vehicle height by the pumping operation during running of the vehicle since the vehicle height is preliminarily increased to some extent before running of the vehicle to increase the road clearance and provide some room for the stroke of the suspension system.

Figure 5:
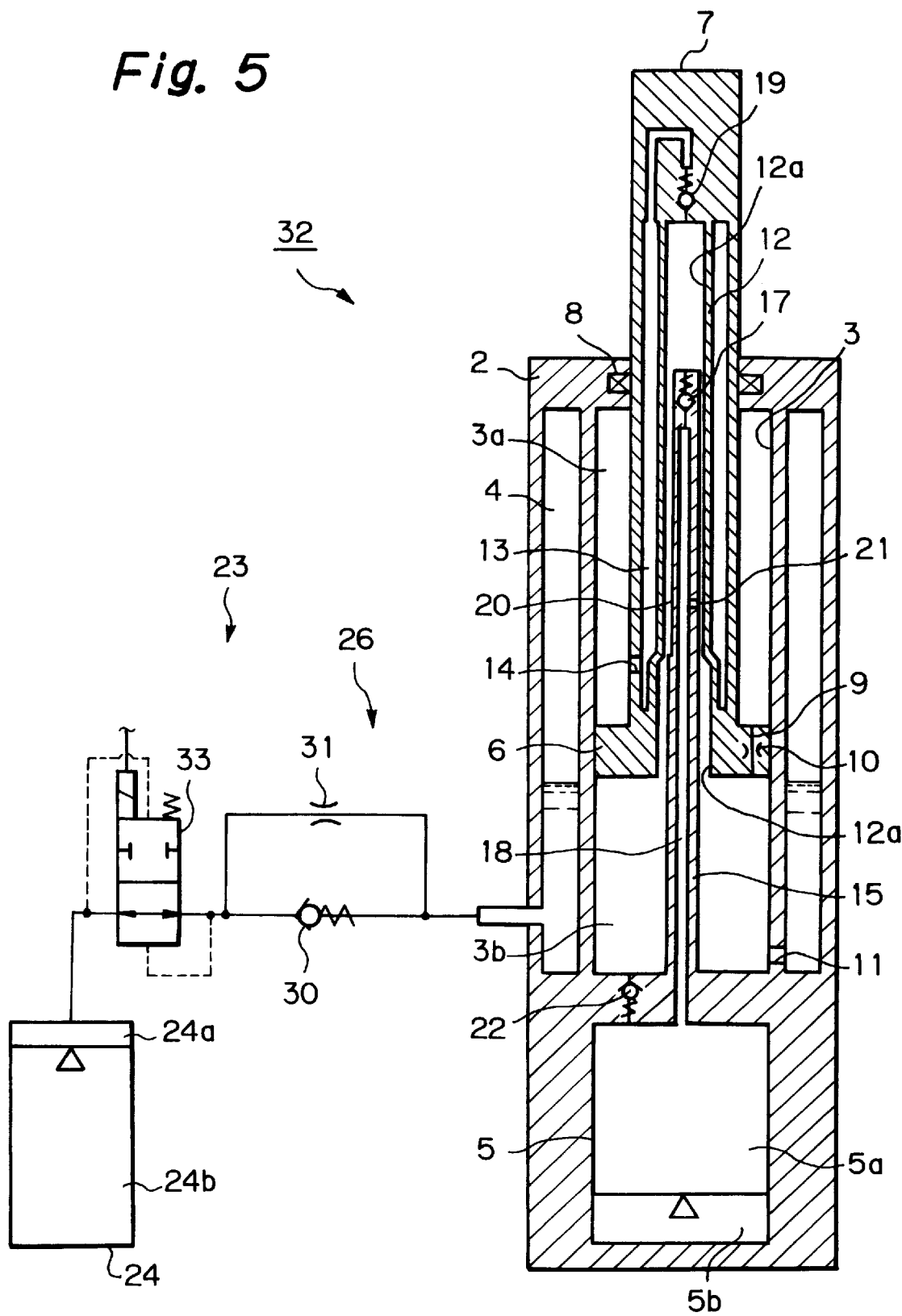
FIG. 5 is a schematic illustration showing a hydraulic shock absorber according to a second embodiment of the present invention.

Next, a second embodiment of the present invention is explained, with reference to FIG. 5. The construction of the second embodiment of the present invention is substantially the same as that of the first embodiment of the present invention, except that the switch valve mechanism in the pressure accumulating mechanism is changed. In FIGS. 1 through 5, like parts or portions are designated by the same numerals. Hereinbelow, explanation is made in detail only with respect to the change in construction of the switch valve mechanism.

As shown in FIG. 5, in a hydraulic shock absorber 32 according to the second embodiment of the present invention, the pressure accumulating mechanism 23 has an open-close valve 33, instead of the switch valve mechanism 25 used in the first embodiment of the present invention. The open-close valve 33 is a pilot type electromagnetic switch valve. When a pressure in the reservoir 4 is higher than the pressure in the pressure accumulating tank 24, the open-close valve 33 opens, to communicate the reservoir 4 with the pressure accumulating tank 24. On the other hand, when a pressure in the reservoir 4 is lower than the pressure in the pressure accumulating tank 24, the open-close valve 33 closes, to thereby block the reservoir 4 from the pressure accumulating tank 24. The open-close valve 33 may be opened by energizing the solenoid with electricity, regardless of pressures in the reservoir 4 and the pressure accumulating tank 24. The solenoid for the open-close valve 33 can be operated by, for example, a switch provided in a vehicle compartment.

By this arrangement, when a pressure in the reservoir 4 is increased by the pumping operation during extension and contraction of the piston rod 7 and becomes higher than the pressure in the pressure accumulating tank 24, the open-close valve 33 opens, thereby supplying the hydraulic fluid into the pressure accumulating tank 24. On the other hand, when a pressure in the reservoir 4 becomes lower than the pressure in the pressure accumulating tank 24, the open-close valve 33 closes, thereby maintaining the hydraulic fluid in the pressure accumulating tank 24. Thus, as in the first embodiment of the present invention, a high-pressure hydraulic fluid can be accumulated in the pressure accumulating tank 24.

When an empty vehicle having a vehicle height which is controlled at the standard vehicle height is loaded, the vehicle height is lowered. In this instance, when the open-close valve 33 is opened by operating a switch in the vehicle compartment, the high-pressure hydraulic fluid in the pressure accumulating tank 24 is supplied to the reservoir 4, to thereby pressurize the gas in the reservoir 4, so that the piston rod 7 extends. When the length of extension of the piston rod 7 reaches the first predetermined length, that is, the vehicle height reaches the standard vehicle height, the switch (in the vehicle compartment) is operated to thereby close the switch valve 33 by the pressure in the pressure accumulating tank 24, so that the supply of hydraulic fluid from the pressure accumulating tank 24 to the reservoir 4 is discontinued. Thus, as in the first embodiment of the present invention, the vehicle height can be increased to the standard vehicle height before running of the vehicle, so that a satisfactorily high road clearance can be ensured before running of the vehicle and hence, bottoming of the suspension system in the vehicle can be prevented.

Incidentally, the types of switch valve mechanism used in the pressure accumulating mechanism in the hydraulic shock absorber of the present invention is not limited to those as used in the first and second embodiments of the present invention. Various types of switching valve mechanisms can be used, as long as they enable a hydraulic fluid to be supplied to and accumulated in the pressure accumulating tank during the pumping operation, and also enable the hydraulic fluid accumulated in the pressure accumulating tank to be supplied to the reservoir by operating a switch at any time.

As mentioned above, in the hydraulic shock absorber of the present invention in which the cylinder provided with a self-pumping mechanism is connected to the pressure accumulating mechanism having the pressure accumulating tank and the switch valve mechanism, during the extension and contraction strokes of the piston rod due to vibration during running of the vehicle, the self-pumping mechanism operates to control the length of extension of the piston rod, thereby controlling the vehicle height at a predetermined level. On the other hand, a pressure is accumulated in the pressure accumulating tank by the pumping operation. When an empty vehicle is loaded and a lowering of the vehicle height occurs, the vehicle height can be increased by switching the switch valve mechanism to apply the pressure accumulated in the pressure accumulating tank to the cylinder, thereby extending the piston rod. Consequently, immediately after the vehicle is loaded, the vehicle height can be increased before running of the vehicle, so that a satisfactorily large road clearance can be ensured before running of the vehicle and hence, bottoming of the suspension system of the vehicle can be prevented.

What is claimed is:

1. A hydraulic shock absorber comprising:
   a cylinder having a hydraulic fluid sealed therein;
   a piston slidably fitted in said cylinder;
   a piston rod having a first end connected to said piston, and a second end extending to the outside of said cylinder;
   a reservoir connected to said cylinder so that pressure is always transmitted between said cylinder and said reservoir;
   an oil tank connected to said cylinder; and
   a self-pumping mechanism including a pump tube portion formed in said piston rod and a pump rod received in said pump tube portion and having a passage therein for communicating the interior of said oil tank to the interior of said pump tube portion, said self-pumping mechanism being adapted to pump hydraulic fluid from said oil tank to said cylinder by the effect of reciprocal relative movement between said pump tube portion and said pump rod so as to raise the pressure in said cylinder to extend said piston rod until the pump tube portion reaches a predetermined position relative to said pump rod to thereby control a length of extension of said piston rod by extension and contraction operation of said piston rod, wherein said cylinder is connected to a pressure accumulating mechanism having a pressure accumulating tank and a switching valve mechanism, said switching valve mechanism being adapted to be switched to selectively accumulate a pressure in said pressure accumulating tank by transmitting the pressure built up in said cylinder to the pressure accumulating tank and apply a pressure accumulated in said pressure accumulating tank to said cylinder.

2. A hydraulic shock absorber according to claim 1, wherein said switching valve mechanism comprises:

a switching valve;

first passage means connecting the switching valve to said cylinder and having a first check valve allowing flow of the hydraulic fluid only from said switching valve to said cylinder and an orifice provided in a passage bypassing said first check valve; and second passage means connecting said switching valve to said pressure accumulating tank and having first passage provided with a second check valve allowing flow of the hydraulic fluid only from said switching valve to said pressure accumulating tank and a second passage parallel with said first passage and having a third check valve allowing flow of the hydraulic fluid only from said pressure accumulating tank to said switching valve, said switching valve selectively connecting said first passage means to said first and second passages of the second passage means.

3. A hydraulic shock absorber according to claim 1, wherein said switching valve mechanism comprises:

a switching valve;

first passage means connecting the switching valve to said cylinder and having a first check valve allowing flow of the hydraulic fluid only from said switching valve to said cylinder and an orifice provided in a passage bypassing said first check valve; and second passage means connecting said switching valve to said pressure accumulating tank, said switching valve is a pilot-operated type open-close valve which takes a first position for communicating said first and second passage means when the pressure in the first passage means is higher than that of the second passage means and a second position for disconnecting said first and second passage means when the pressure in the second passage means is higher than that in the first passage means, said switching valve mechanism further having means for switching said open-close valve to said first position regardless of the pressures in said first and second passage means.

* * * * *